United States Patent

Griffin

[15] 3,641,555

[45] Feb. 8, 1972

[54] COMPUTER TERMINAL APPARATUS

[72] Inventor: John R. Griffin, Portland, Oreg.

[73] Assignee: Tektronix, Inc., Beaverton, Oreg.

[22] Filed: Dec. 9, 1968

[21] Appl. No.: 782,254

[52] U.S. Cl. ..........340/324 A, 179/2 DP, 315/8.5, 315/10, 315/12, 328/123, 328/124, 340/153, 340/172.5

[51] Int. Cl. ..........G06f 3/14

[58] Field of Search ..........340/324.1, 172.5, 15.3, 324 A; 179/2 DP, 2 TV; 315/8.5, 8.6, 10, 11, 12; 328/123, 124

[56] References Cited

UNITED STATES PATENTS

| | | | |
|---|---|---|---|
| 3,130,397 | 4/1964 | Simmons | 340/324 |
| 3,307,156 | 2/1967 | Durr | 340/324 X |
| 3,428,851 | 2/1969 | Greenblum | 340/324 X |
| 3,500,327 | 3/1970 | Belcher et al. | 340/324 X |
| 3,403,391 | 9/1968 | McCown | 340/324 A |
| 3,505,665 | 4/1970 | Lasoff et al. | 340/153 X |
| 3,533,084 | 10/1970 | Cook et al. | 340/153 X |
| 3,214,631 | 10/1965 | Anderson | 315/12 |
| 3,325,673 | 6/1967 | Anderson | 315/12 |
| 3,426,236 | 2/1969 | Mepham | 315/12 |
| 3,426,237 | 2/1969 | Calnon et al. | 315/12 |
| 3,430,093 | 2/1969 | Winningstad | 315/10 |

*Primary Examiner*—John W. Caldwell
*Assistant Examiner*—David L. Trafton
*Attorney*—Buckhorn, Blore, Klarquist and Sparkman

[57] ABSTRACT

A computer terminal, e.g., for communicating with a remote computer via a telephone link, includes a bistable cathode-ray storage tube having a split screen comprising first and second storage portions, and an input device such as a keyboard for writing a line of information on a first portion of the tube target. A shift register is employed for digitally storing a line of information inserted therein from a local keyboard. The same line of information is written on a first portion of the target from the shift register. This line of information is selectively correctable by inserting corrections in the shift register, erasing the first portion of the target, and rewriting the contents of the shift register. The corrected line may then be transmitted from the shift register to the distant computer, and a plurality of lines of information are written on the second portion of the cathode-ray tube split-screen target from the computer. Each corrected line may be added to computer storage and displayed on the second part of the split-screen target.

18 Claims, 3 Drawing Figures

JOHN R. GRIFFIN
*INVENTOR*

*BY*

*BUCKHORN, BLORE, KLARQUIST & SPARKMAN*
*ATTORNEYS*

JOHN R. GRIFFIN
*INVENTOR*

*BY*

*BUCKHORN, BLORE, KLARQUIST & SPARKMAN*
*ATTORNEYS*

COMPUTER TERMINAL APPARATUS

BACKGROUND OF THE INVENTION

Time-shared operation of computers makes possible a dialog between computer users at a number of remote terminals and a centrally located computer. Since the computing speed is very rapid, each user can interact with the computer nearly on a "real time" basis.

Remote computer terminals can take a number of forms, a popular one being a teletypewriter and keyboard wherein the keyboard comprises an input device for transmitting information to the computer, and the teletypewriter transmits information back. The teletypewriter has the disadvantage of a relatively low print rage, e.g., a maximum speed of approximately 200 words per minute, and does not use the full transmission capability of the usual telephone line.

Cathode-ray tube terminal output devices are much more rapid. An ordinary cathode-ray tube must, however, be periodically refreshed, e.g., at the rate of 30 to 60 "refreshes" per second, in order to avoid undue flicker in the output display. The higher the information density transmitted, the more likely it is that an annoying flicker will occur. Many systems do not restrict the flicker rate to a fixed lower limit, where the system does not function below that limit. Instead, they allow the refresh rate to vary with the amount of information that must be written. At high information densities, the refresh cycle may take so long that the display visibly blinks. Even if the flicker is at first unnoticeable, it may become very tiring to the user after a period of time. Another drawback to the variable refresh rate is that, at certain frequencies, it "beats" with fluorescent lamps and becomes more noticeable and objectionable. A certain amount of jitter or wiggle is also sometimes experienced with refreshed displays.

Telephone lines have a low transmission rate, greatly restricting the number of characters of information which could be transmitted and written at a flicker-free rate. Extensive local refreshing memories of appreciable capacity must be employed if any reasonable number of characters are to be viewed and refreshed without undue flicker. Even then, the refreshing rate restricts the detail that may be presented, or the number of characters that may be presented, and complicates the character generators that may be used. The circuit for coupling into and out of the local memory, and for character or vector generation or the like, must be of high speed to accomplish rapid, or minimum flicker-producing, refreshing of a reasonably high-density display.

A more satisfactory terminal output device in many ways comprises a bistable cathode-ray storage tube. The ability of the storage target of the tube to retain the stored image eliminates flicker as well as the need of a relatively large local memory and associated refreshing circuitry. Character generation circuitry is simplified because of the speed requirements for generating symbols at refresh speeds is removed. The principal advantages of a direct-view bistable storage tube terminal are its reasonable cost, good resolution, absence of flicker, and ability to display both alphanumerics and graphics in a wide range of formats.

The use of a bistable direct-viewing cathode-ray storage tube without a large local memory or the like presents one problem insofar as collecting and editing the transmitted information is concerned. The usual bistable storage tube is not easily erasable without erasure of the entire stored block of data characters. Thus, an editing feature which may be employed with a refreshed CRT is not inherently available in the case of the bistable storage tube, without erasure of previously received information, and the necessity of retransmission thereof to complete a display.

SUMMARY OF THE INVENTION

According to the present invention, a bistable storage tube is employed which is provided with a storage target electrode having plural conductive areas so as to provide a split-screen device. This tube is of the type set forth and claimed in Robert H. Anderson, U.S. Pat. No. 3,214,631 issued Oct. 26, 1965, entitled "Tube Having Target with Store and/or Non-Store Sections," and assigned to the assignee of the present invention. The two portions of the split screen are preferably quite dissimilar in size so as to provide a larger portion of the screen for writing several lines of information, with a smaller portion of the screen for writing one line which may be easily corrected. A circulating memory device having the capacity of one line of information is employed in conjunction with the smaller portion of the split-screen tube. The digits corresponding to the line of information are circulated in this memory while a memory position counter operating synchronously with circulation in the memory keeps track of the address of information in an input-output register portion of such memory. A reference position counter is controllable from an input keyboard or the like and when the reference position counter agrees with the memory position counter, information may be entered from the keyboard or other input device into the memory.

Information from the memory is also presented to a character generator connected to the cathode-ray storage tube for writing a corresponding line of characters on the smaller portion of the split screen. When the line as written appears incorrect, or for some reason some change needs to be made therein, the reference position counter is addressed to the location of the incorrect character representation, and new information is entered into the memory. This information may also be written on the smaller portion of the split-screen display underneath the character replaced. Then the entire line may be erased from the smaller portion of the split screen and rewritten from the memory.

When the line of information is correct, it can be transmitted from the local memory to the remote computer. Information from the remote computer is also stored directly on the larger portion of the split-screen tube. Thus, when a corrected line is sent to the computer, it may be retransmitted from the computer and placed, along with other data, on the larger portion of the screen.

It is accordingly an object of the present invention to provide an improved computer terminal apparatus which is simplified and economical, and which at the same time allows flexibility in changing or editing stored information.

It is another object of the present invention to provide improved computer terminal system employing a bistable cathode-ray storage tube wherein a line may be corrected and erased without erasing or removing information it is desired to keep on the cathode-ray tube display.

It is a further object of the present invention to provide an improved computer terminal wherein material may be easily addressed and changed or edited.

It is a further object of the present invention to provide an improved computer terminal including a cathode-ray tube wherein information is conveniently stored by the tube, but which may be rewritten with a minimum of complex equipment.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
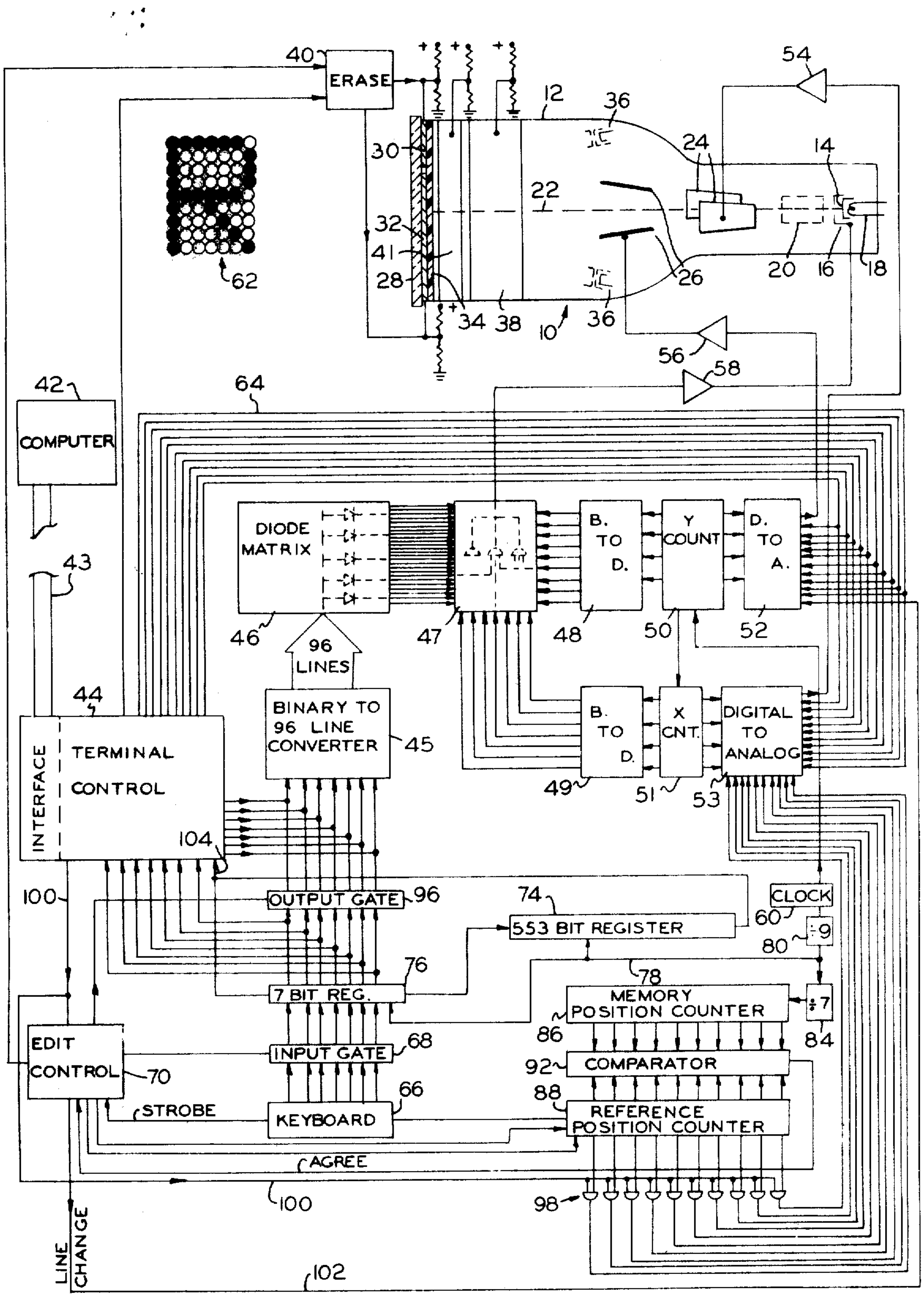
FIG. 1 is a block diagram of a computer terminal system according to the present invention.
Figure 2:
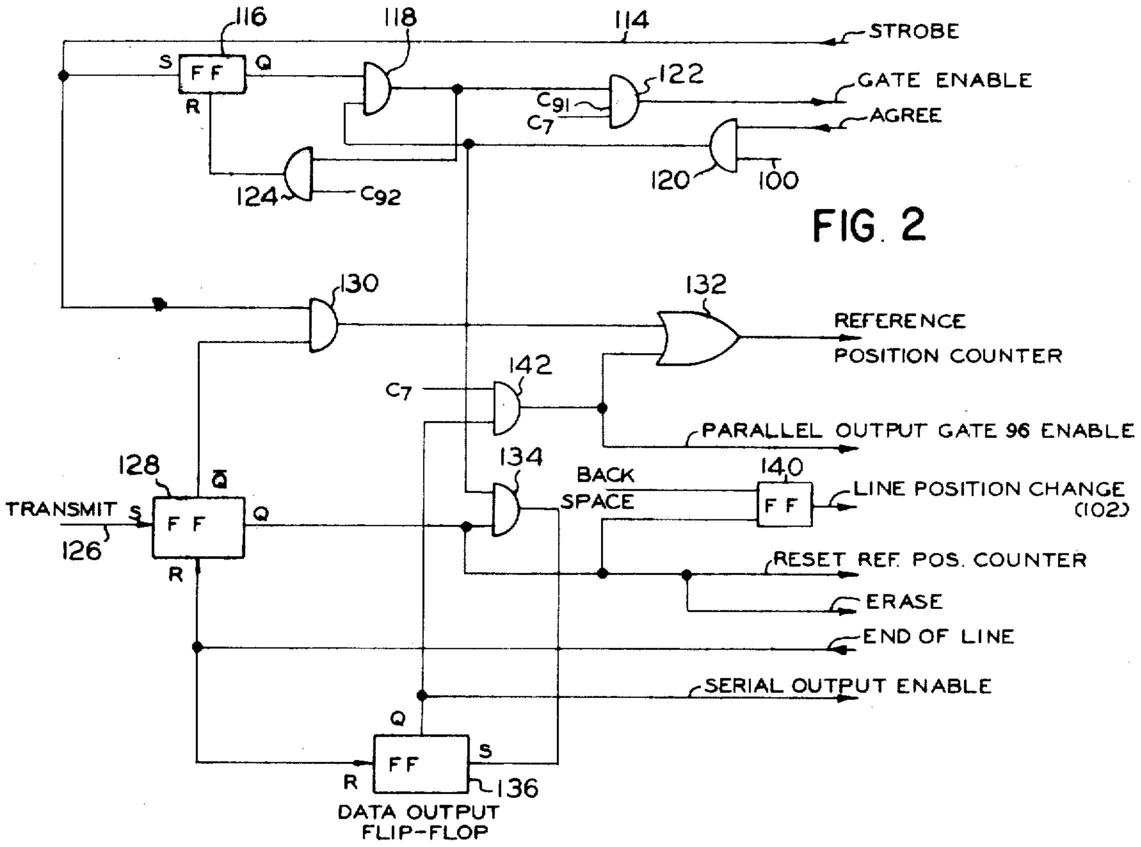
FIG. 2 is a block diagram of an editing control circuit according to the present invention.

Referring to the drawings, and particularly to FIG. 1, a computer terminal includes a storage tube 10. The storage tube comprises an envelope 12 having a principal electron gun including a cathode 14, a control grid 16, a filament 18, and a focusing and accelerating structure 20. The electron beam 22 produced by the principal electron gun is deflected horizontally by means of horizontal deflection plates 24 and vertically by means of vertical deflection plates 26. The beam 22 is in general directed towards a target disposed on the inner side of glass end plate 28, such storage target including a transparent storage electrode which may comprise a thin conductive layer such as tin oxide. The electrode is divided into separate conductive areas or portions 30 and 32 separated by a gap therebetween in the conductive layer. These conductive areas or portions are coated over the inner surface by a secondary emissive dielectric layer 34 of phosphor material. This layer is an integral semicontinuous phosphor layer which has a sufficiently porous structure to enable transmission of secondary electrons through such layer for collection by the conductive areas of the target electrode. Alternatively, portions of the target electrode areas may extend through portions of the phosphor layer to provide a raised collector configuration.

The storage tube 10 is additionally provided with one or more flood-type electron guns 36 which are supported inside envelope 12 adjacent the ends of vertical deflection plates 26 closest to the target. Electrons emitted from the flood guns diverge into a wide beam which is substantially uniformly distributed towards phosphor layer 34. A plurality of electrodes are also provided on the inner surface of envelope 12 beyond the flood guns. A first electrode 38 connected to the midpoint of a voltage divider disposed between a positive voltage and ground acts to provide a more uniform electric field for collimating electrons. A second electrode 41 near the target end of the tube is also connected to the midpoint of a voltage divider between a positive voltage and ground and acts to collimate electrons as well as possibly to collect secondary electrons to a certain extent.

A storage tube and target of the foregoing type is set forth and claimed in U.S. Pat. No. 3,214,631 to Robert H. Anderson, issued Oct. 26, 1965, entitled "Tube Having Target With Store and/or Non-Store Sections," and assigned to the assignee of the present invention. This storage target may also be of the raised collector type as set forth and claimed in the copending application of Roger A. Frankland, entitled "Cathode Ray Storage Tube and Method of Manufacture," filed Feb. 28, 1967, Ser. No. 619,904, and which is also assigned to the assignee of the present invention.

During operation of the tube, the tube potentials are such that beam 22 has a relatively high velocity for writing and is capable of producing secondary electrons when it strikes phosphor layer 34. Secondary electrons are then suitably collected by the target electrode comprising areas 30 and 32, in which case an elemental area of target can be driven positive or written as the result of secondary emission. A written area is retained at a relatively positive potential after beam 22 has passed such elemental area because of the action of the flood guns 36. Flood guns 36 produce relatively low-velocity electrons which strike the target but which ordinarily have insufficient velocity for writing information. When electrons from flood guns 36 strike areas of the target upon which a positive charge has not been written, these flood electrons tend to maintain such areas at the relatively negative potential of the flood guns. This is one stable potential level of the target. However, the flood gun electrons are attracted by positive elemental areas and obtain a high velocity with respect to these areas for producing continued secondary emission therefrom. Therefore these last-mentioned areas are maintained relatively positive or near the potential of the target electrode. This latter potential comprises the second stable potential level of the target. The target thus has bistable properties and is capable of retaining information written thereon, with the flood beam of electrons driving target areas toward one of two stable potentials depending upon the information written thereon with beam 22. Since the dielectric 34 comprises a phosphor, the storage tube is of the direct viewing type, and information once written thereon, can be retained almost indefinitely by the storing action of the flood guns. Thus the target need not be "refreshed" or continuously written with information, but the desired presentation need be delivered only once to the storage tube.

Figure 3:
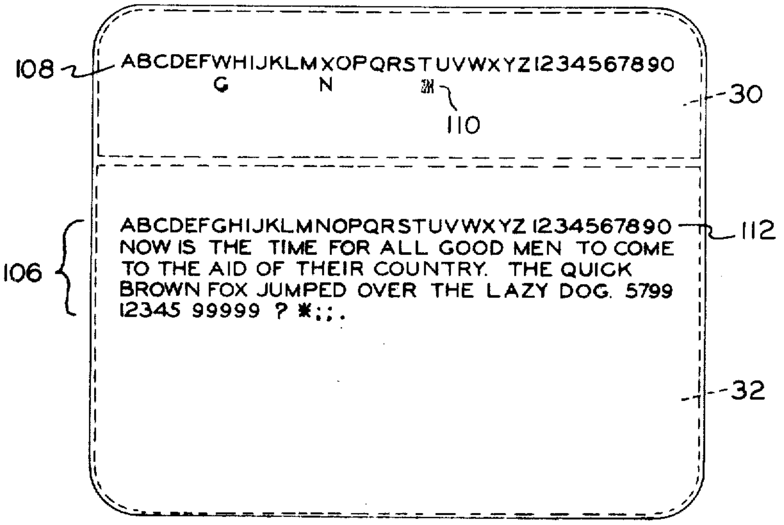
FIG. 3 is a view of a presentation of a bistable storage tube according to the present invention as viewed from the front thereof.

Since the storage target electrode includes two areas or portions 30 and 32, the potential of which may be adjusted independently, separate information may be stored or not stored on the phosphor immediately over these areas. In accordance with the present embodiment, portion 32 is preferably much larger than portion 30 as is also illustrated in FIG. 3. In the present embodiment of the invention, the larger portion of the storage target, at the location of larger portion 32 of the target electrode, stores information derived from a remote computer memory, while the smaller portion of the target, of which portion 30 is a part, is written locally and may be conveniently erased or edited. For erasure purposes, portions 30 and 32 are each connected to an erase generator 40 connected respectively to target electrode portions 30 and 32, and also to voltage dividers disposed between a positive voltage and ground. An erase signal applied by the erase generator 40 comprises a positive-going pulse immediately followed by a negative-going pulse. The positive portion of this signal fades the target positive, that is, causes the entire target to attain a positive state of secondary emission corresponding to the written bistable state of the target. The negative-going portion of the signal returns the entire target to a negative or nonwritten condition. This erase procedure is preferred because it results in uniform erasure wherein the entire target can end up at substantially the same potential. The erase generator 40 can selectively provide such an erase pulse to either one or both of target electrode portions 30 or 32 for selectively erasing the information stored on the adjacent phosphor 34.

Referring further to FIG. 1, a computer 42, which may be located at a remote point and operated in a time-share mode, is connected to a local interface and terminal control 44 of the computer terminal via a telephone line or the like 43. The interface and terminal control can directly operate a character generator including components numbered 45 through 53 which are connected to operate the bistable storage tube via horizontal amplifier 54 connected to horizontal plates 24, vertical amplifier 56 connected to vertical plates 26, and Z-axis amplifier 58 connected to control grid 16.

The character generator comprises a dot character generator. The CRT beam 22 is moved thereby to a position, unblanked, moved to another position, unblanked, etc., with the dots being arranged in such a pattern that the results form a letter, number, or punctuation mark (collectively called characters). Random movement of the beam between dots for each character is impractical, since this would be essentially a point-plot mode and would require several 12-bit words from a computer for each dot. Instead, the beam is made to step through a fixed pattern, here comprising a rectangle of seven-by-nine-dot positions. The dot rectangle is called a dot matrix. The characters are formed by turning on the electron beam 22, or at least by turning it on to a greater extent, at selected positions as the beam is stepped through the matrix. The blanked-dot rectangle is longer in the vertical axis than in the horizontal axis to give the characters the correct aspect ratio. For example, nine dots vertical and seven dots horizontal make up a 7×9-dot matrix.

Beam stepping is operated in synchronism with a system clock 60. The clock is an oscillator, the output of which is squared up to provide a clock pulse for each oscillation. The output of the clock is sent to a nine-count Y counter 50. The Y counter 50 counts from one to nine and then resets. Each clock-pulse input causes the counter to increment once. The X counter 51 counts from one to seven, and then resets. Each reset of the Y counter causes the X counter to increment once. The X counter then increments each time the Y counter has counted up to nine. The counters are of the binary type, and provide their outputs respectively to binary-to-decimal converters 48 and 49, and to digital-to-analog converters 52 and 53.

The Y digital-to-analog converter 52 changes each number in the counter to a vertical analog-position voltage. As the counter counts, analog voltage steps are applied to the vertical deflection plates through amplifier 56. The X digital-to-analog converter 53 changes each number in the X counter to a horizontal analog-position voltage. As the X counter counts, analog voltage steps are applied to the horizontal deflection plates 24 via horizontal amplifier 54.

According to the sequence, the clock drives the Y counter for nine counts, and at that time the Y counter resets. The reset increments the X counter one count. Then, there are nine more Y counts, the X counter increments, and so on. The result will produce a dot matrix as indicated at 62 in FIG. 1. If the beam were unblanked, the display would appear as a vertical row of dots, a horizontal shift, and then another vertical row of dots, etc. The counter outputs thus cause the X and Y digital-to-analog converters to output analog voltages that step the beam in the pattern of the 7×9-character rectangle. The beam has been stepped through a total of 63 positions.

The Y binary-to-decimal converter 48 has nine output lines and the X binary-to-decimal converter 49 has seven. As the Y counter 50 counts from one to nine, the Y binary-to-decimal converter will have outputs first on line 1, then 2, then 3, and so on up to 9. The X binary-to-decimal converter 49 acts in the same manner, but has only seven output lines. These output lines are connected to a 7×9 scanning sense array 47 to provide information as to the beam position on the display. This is necessary to assure that the proper dots can be unblanked to draw the character. The scanning sense array is made up of 63 triple input AND gates, one gate for each dot position in the character matrix. When all three inputs of an AND gate are energized, an output is provided to Z-axis amplifier 58 causing the particular dot to be unblanked. Thus, there is one AND gate for each possible dot position.

The other inputs to the scanning sense array 47 will now be considered. The character selection is made by a seven-bit code, or seven characters in parallel from the computer interface. Each combination of those seven bits or a "word" will cause a unique character to be written. The seven-bit word is entered into a register within binary-to-96 line converter 45. Binary-to-96 line converter 45 also includes a symbol-select matrix or decoder which interprets the seven-bit code and selects the proper character line. Generally there are 96 possible character lines, in correspondence to the ASCII code, that is, the American Standard Code for Information Interchange, or a teletypewriter modification thereof. The seven-bit word is capable of 128 unique selections. Those left over may be used for special commands, instead of characters. The decoding of this binary digit series or word into an output on one of the 96 lines is accomplished in a conventional manner, and a number of conventional circuits may be used therefor such that each unique binary combination produces an output on no more than one of the 96 lines.

The 96 output lines from binary-to-96 line converter 45 are connected to a diode matrix memory 46. When one of the 96 lines is activated, a number of diodes connected to that line are put in conduction. Each of these diodes connects to the scanning sense array 47. It takes from four to 25 diodes to make up a character, depending upon its complexity. The average character takes 16.7 diodes. Since there are 96 possible characters, and there are an average of 16.7 diodes per character, the diode matrix contains approximately 1,600 diodes. For each of the 96 lines, a plurality of diodes connect to ones of the AND gates in scanning sense array 47 for selecting the dots in the array which are to be unblanked in order to produce a representation of a character. The letter "R" in dot matrix 62 is composed of 26 dots, there being one diode in diode matrix 46 for each such dot.

The diodes in diode matrix 46 may be termed a "read only memory," because whenever one line of the 96 is activated, specific diodes transfer the information to the scanning sense array. The diode circuitry has "memorized," that is, it is wired to connect specified diodes when a character line is activated.

Returning to scanning sense array 47, when the input from the X and Y binary-to-decimal converters 48 and 49 (indicating dot position) coincide with the character information for a dot which is to form part of the character, the scanning sense array outputs a pulse to turn on the Z-axis amplifier 58, so that the particular dot will be written and stored on the bistable storage tube target. Such a coincidence has taken place at 26 points in the dot matrix 62 to form the letter R. Thus the seven-bit word applied to binary-to-96 line converter 45 causes the character generator to unblank designated dot positions as the character generator steps through the 7×9 matrix. The resultant character is formed from up to 30 of those 63 dots. Conventional circuitry is employed in digital-to-analog converters 52 and 53 as well as the counters and binary-to-decimal converters 48 and 49.

The digital-to-analog converter 52 receives further information from interface and terminal control 44 via position lines 64. These lines encode in binary fashion the desired location of a particular character upon the face of the cathode-ray tube, specifically on the lower part thereof defined by target electrode portion 32, e.g., as illustrated in FIG. 3. Thus, the interface and terminal control provides control signals on lines 64 which coarsely set the location of electron beam 22. Then, the information delivered to binary-to-96 line converter 45 unblanks the electron beam as clock 60 moves the electron beam position through the dot matrix. Each difference in deflection information digitally provided via lines 64 grossly positions the electron beam to a different location separated from other locations by more than the width or the height of the dot matrix.

The information thus written on the lower portion of the bistable storage tube target, e.g., at 106 in FIG. 3, is derived from the memory of computer 42, and may represent either information originally located in the computer memory, or may represent information originating at the computer terminal and returned for display. For viewing information transmitted to the computer, the upper part of the storage tube target is employed, i.e., the part defined by target portion 30. Generally, one line of information, e.g., line 108 in FIG. 3, is written across the target portion 30, and then this information is transferred to the remotely located computer from which it may be returned again for adding to information stored on the lower part of the storage tube target.

For originating information to be transmitted, an input device such as a conventional keyboard 66, which may be of the typewriter or teletypewriter type, is employed. This keyboard originates a seven-bit binary word for each of the characters it may select, e.g., in teletypewriter fashion. This information is supplied to the system via input gate 68. When a key is pushed on keyboard 66, it may cause edit control 70 to energize the input gate 68 for transmitting the information to a recirculating memory.

This recirculating memory suitably comprises a shift register having a principal portion 74 and an input portion or buffer register 76 which comprises an extension thereof into which information may be entered or retrieved in either serial or parallel fashion. The principal shift register 74 is a 553-bit register in the present embodiment, and thus serially stores 79 seven-bit words. With the addition of register portion 76, a total storage of 80 words representative of 80 characters, or the line of information across the upper part of the storage tube target, is possible. The shift register suitably comprises a plurality of flip-flops or the like, one for each bit, which are connected to transfer information from one to the next upon a command on shift line 78. Line 78 is driven from clock 60 by way of a divide-by-nine circuit 80 so that all bits in the register can be shifted seven positions within the time allotted for the writing of a dot matrix.

The output of principal shift register 74 is connected to the input of register portion 76, and the output of register portion 76 is connected to the input of principal shift register 74 so that digital information can be continuously serially circulated in the register. The shift line 78 is also connected via a divide-by-seven circuit 84 to a memory position counter 86, and memory position counter 86 will then increment by one count when seven bits which comprise a new word indicating a new character are shifted into register portion 76. Memory position counter 86 has a capacity of 80 counts and then starts over. Therefore the count in counter 80 keeps track of an identification for the particular shift register word which at the time resides in register portion 76.

A similar reference position counter 88 is incremented from edit control 70, e.g., when a keyboard key is depressed. As each key on the keyboard is operated, a strobe signal causes edit control 70 to add an additional count to reference position counter 88. A comparator 92 compares the count in memory position counter 86 with a count in reference position counter 88. When the two coincide, comparator 92 will cause edit control 70 to operate input gate 68, in one mode of operation, so that the character word sent by the keyboard will be entered into the register portion 76. If any other information is in register portion 76, it will be replaced by information from the keyboard. Thus, as each successive key is depressed to write one of a line of characters across the upper portion of the target, reference position counter 88 is incremented and the memory position counter must reach the next higher count before comparator 92 signals the edit control. Thus, each successive word transmitted from the keyboard will be located in the next word position in the shift register, and will be entered in parallel fashion via register portion 76.

During writing of a line, output gate 96 may also be enabled each time a coincidence takes place between the contents of memory position counter 86 and that of reference position counter 88, for causing a corresponding character to be written on the upper portion of the cathode-ray tube target. Each time reference position counter 88 is incremented, the count is also transferred via a bank of AND-gates 98 to X-axis digital-to-analog converter 53. Reference position counter 88 thereby establishes the coarse horizontal deflection so that each successive character will be stored at the next character location across the line of the stored display. AND-gates 98 are enabled by line 100 from interface and terminal control 44, as is edit control 70, so that information is written locally on the upper portion of the cathode-ray tube display on command from the computer interface and terminal control, at a time when character information is not being written on the lower portion of the tube corresponding to transmission from the computer memory.

AND-gates 98 control the setting of digital-to-analog converter 53 in the same way for X deflection as do lines 64 coupled thereto. During local writing upon the upper portion of the cathode-ray tube display, edit control 70 provides a voltage on line 102 applied to Y-axis digital-to-converter 52 so that the electron beam is deflected vertically into the region of target portion 30, and into a particular line position.

At the end of each line, e.g., after a maximum number of characters has been written across the upper face of the CRT by keyboard 66, an end-of-line signal may cause the edit control 70 to operate erase generator 40, or enable the operation of the erase generator, for delivering an erase pulse to target electrode portion 30. The end-of-line signal may originate from an end-of-line code word stored in the circulating register and detected via output gate 96, by means not shown. The upper part of the display is thereby erased, but edit control 70 suitably delivers an enabling signal to gate 96 so that the entire line is rewritten across the upper face of the CRT. At this time, edit control 70 also steps reference position counter 88. The erase and rewrite functions are suitably under the control of a transmit input command as hereinafter indicated.

Electron beam 22 is normally biased off except when a dot, forming a part of a character, is to be written. However, it should be noted that the dot matrix 62 can be rendered visible on the face of the CRT in a cursor mode even if the character generator is not operated to provide the writing of a character. For this purpose, a Z-axis amplifier 58 is enabled for a very short time for each dot in the dot matrix, not long enough to store a dot, but so that the dot will be visible to the observer. Thus, after a line has been written across the upper portion of the cathode-ray tube display, the dot matrix 62 is positionable along and underneath this first line as illustrated in FIG. 3 at 110. Edit control 70 delivers a voltage on line 102 causing digital-to-analog converter 52 to drop electron beam 22 down to the position of the next line. Reference position counter 88 is incremented under the control of edit control 70, usually by a backspace signal from the keyboard, so the counter is incremented negatively, and operation is in a cursor mode so the operator may position the dot matrix 62 immediately under a character he wishes to change. When the particular location is reached, the correction is entered with the keyboard 66. When comparator 92 registers the coincidence of the count in counters 86 and 88, gates 68 and 96 are energized causing input gate 68 to deliver the correct character to register portion 76, and suitably causing output gate 96 to deliver the same information to binary-to-96 line converter 45. Thus, the information in the shift register is actually changed, and a corrected character is written on the cathode-ray tube under the character it is to replace. Again, when all the corrections have been made and the edit control is given end-of-the-line information, the entire line can be erased by means of erase generator 40 as described above, and the line is rewritten, in its normal position, from the shift register portion 76 through output gate 96.

Assuming all the corrections have been made on the line of information and this line is edited correctly for transmission to the computer, interface and terminal control 44 can receive the information either serially via connection 104 or in parallel from register portion 76. This information is transmitted to the memory of computer 42, and then may be retransmitted by the computer back to the interface and terminal control 44 for writing the new line in conjunction with other lines on the lower portion of the cathode-ray tube target, i.e., on the portion defined by target portion 32, and as indicated at 112 in FIG. 3. Of course, the lower portion and/or the upper portion of the display may be erased by erase generator 40 under the control of interface and terminal control 44 at such time as the new information is to be transmitted from the computer.

The above description is general and apparatus according to the present invention may be operated in various ways within the scope of the present invention. A specific example of a major portion of important edit control circuitry is illustrated in the FIG. 3 diagram.

Referring to FIG. 3, a strobe signal on line 114 from the keyboard indicates that a character key has been depressed. This strobe signal sets flip-flop 116 which provides an input for AND-gate 118. When an agree signal is received from comparator 92, and interface and terminal control 44 energizes line 100 to energize edit control operation, AND-gate 120 will provide a second output to AND-gate 118. The output of AND-gate 118 is applied to AND-gate 122 in conjunction with clock signals $C_{\phi 1}$ and $C_7$. The signal $C_{\phi 1}$ is the first phase of a clock output from divide-by-nine circuit 80. $C_7$ is an output from divide-by-seven circuit 84. Thus, when a complete word resides in register portion 76, AND-gate 122 will be enabled by the clock signals at a first phase time. The output of AND-gate 122 enables input gate 68, and may selectively enable output gate 96 when it is desired to transmit information at the same time to the character generator, for example. The enablement of gate 68, and also possibly gate 96, occurs for only a short period of time since a second phase clock signal $C_{\phi 2}$ is connected to operate AND-gate 124 in conjunction with the output from AND-gate 188. At such second clock phase time, flip-flop 116 is reset. Thus, information may be inputted or outputted from register portion 76 only when a complete word identifying a character resides therein.

The strobe on line 114 is also applied to AND-gate 130 in conjunction with the $\overline{Q}$ output from flip-flop 128. Assuming flip-flop 128 is not operated, the strobe will step reference position counter via OR-gate 132.

If it is desired to transmit the whole contents of the circulating shift register, either to the character generator or to the interface and terminal control, a transmit input 126 is applied to flip-flop 128. The absence of a $\overline{Q}$ output from flip-flop 128 disables AND-gate 130 so the reference position counter 88 will not count in response to strobe signals from the keyboard. The Q output is applied to AND-gate 134 in conjunction with the output of gate 120, such that data output flip-flop 136 is set when an agree signal is received from comparator 92. Also, the Q output of flip-flop 128 is applied to flip-flop 140. Flip-flop 140 will change state so that line position change information is delivered on line 102. Thus, when it is desired to transmit information to the character generator and CRT, the rewriting will take place on a different (alternative up or down) line level, but still within the upper portion of the target. The reference position counter 88 is also reset to zero by output Q, and the same Q output is delivered to erase generator 40 for erasing the previously stored information on the upper portion of the target.

Now the previous line stored by the cathode-ray tube has been erased, and the reference position counter 88 has been reset to zero, so AND-gate 134 will be operated when the memory position counter also provides a zero output causing the comparator to deliver an agree signal. Data output flip-flop 136 will thereupon be set via AND-gate 134, and the Q output of flip-flop 136 will turn on AND-gate 142 in conjunction with clock signal $C_7$. As a result, the reference position counter is stepped by OR-gate 132 and parallel output gate 96 is enabled. Each time a clock signal $C_7$ is received by AND-gate 142, parallel output gate 96 is again enabled. Thus, both OR-gate 132, providing a stepping input to the reference position counter, and parallel output gate 96 are enabled every time a word corresponding to a character is contained within register portion 76. When an end-of-line signal is received, e.g., from means not shown, for instance, detecting an end-of-line word stored in the circulating shift register, flip-flops 128 and 136 are reset.

Although the circuit is described above as operative for providing parallel output of data via output gate 96, a serial output enable signal comprising the Q output of flip-flop 136 is also applied to interface and terminal control 44. This serial output enable signal suitably connects line 104 continuously to provide an output of the serial contents of the circulating shift register to the computer interface so long as flip-flop 136 is in its operated or set condition.

A backspace signal applied to flip-flop 140 from the keyboard is also effective to provide a line position change signal on lead 102 (alternatively up or down) by changing the state of flip-flop 140. The backspace command is used for moving the dot matrix from right to left, e.g., underneath a line already written, for example, at a position 110 in FIG. 3. The line position change command moves the dot matrix from the location of line 108 to the lower position. The backspace command also decreases the count in reference position counter 88 by conventional means not shown for accomplishing the backspacing. When backspacing of the dot matrix has been brought about to the location where a change for a particular character in the recirculating shift register is desired, the desired change is entered via the keyboard.

It is to be understood that above-described circuitry is simply illustrative of application of the principles of the invention. Numerous other arrangements may be readily devised by those skilled in the art which will embody the principles of the invention and follow the spirit and scope thereof.

I claim:

1. Computer terminal apparatus comprising:

a bistable cathode-ray tube including means for providing an electron writing beam, a split-screen target towards separate portions of which said beam may be alternatively directed, and flood gun means for directing electrons at said target for bistably retaining written information thereon, said tube also being provided with orthogonal beam deflection means;

character generator means coupled to said orthogonal deflection means for causing said writing beam to write the configuration of a desired character;

a recirculating memory means and a local input device for entering information into a selected portion of said recirculating memory means;

output means for coupling information from a selected portion of said recirculating memory means for operating said generator for causing said electron writing beam to write a character, indicated by such information from said selected portion, upon a first portion of said split-screen target; and computer interface control means coupled to cause said electron beam to write a character, identified by information from a computer, on a second portion of said split screen target for bistable storage thereupon.

2. The apparatus according to claim 1 further including a reference position counter under the control of said input device;

a memory position counter operating synchronously with recirculation of information in said recirculating memory means;

and a comparator means for registering identify between the contents of the reference position counter and the memory position counter for selectively enabling the coupling of information from said input device to a selected portion of the recirculating memory means, and for selectively coupling information from a selected portion of the recirculating memory means to said character generator means.

3. The apparatus according to claim 2 wherein said recirculating memory means has a capacity for circulating binary digits corresponding to a line of characters across the first portion of the split-screen target.

4. The apparatus according to claim 2 including means for setting said reference position counter to a count indicating the location of information in said recirculating memory means for a character which it is desired to change for entering replacement information in said recirculating memory means at such location in response to recognition of said location by said comparator means.

5. The apparatus according to claim 4 wherein said replacement information is entered from said local input device.

6. The apparatus according to claim 4 further including means for transmitting information from said recirculating memory means representing corrected information to a computer.

7. The apparatus according to claim 1 including means for entering information from the recirculating memory means, representing a line of characters, into the computer for subsequent writing on said second portion of said split-screen.

8. Computer terminal apparatus comprising:

a bistable cathode-ray storage tube including a target having a support member of insulative material, a first electrically conductive area on one portion of the support member, a second electrically conductive area on another portion of said support member on the same side thereof and insulatingly spaced from the first area, and a storage dielectric of phosphor supported at least partially over said first and second areas, said tube further including an electron beam means for writing information on said phosphor with an electron beam, and a flood beam means directed towards said phosphor for establishing bistable storage properties thereof, said tube also including orthogonal deflection means for deflecting said beam;

a character generator for receiving digital information from a computer interface and for translating said information into deflection voltages for said cathode-ray tube for deflecting the writing beam thereof in the configuration of digitally selected characters, and including means for controlling the deflection of the writing beam for writing said characters on the second area of said target when said character generator receives information from said computer interface;

shift register means for receiving and serially circulating a line of digital data, said shift register means including a register portion into which digital information may be written, or from which digital information may be retrieved;

means for selectively outputting information from said register portion for operating said character generator;

a keyboard for entering information into said register portion;

a reference position counter selectively under the control of said keyboard;

a memory position counter for operating synchronously with recirculation of information in said shift register;

a comparator for registering coincidence between said reference position counter for causing the entering of digital information indicating a character from said keyboard into the said register portion, and for selectively outputting information from said register portion to said character generator; and control means for directing the electron beam from said electron beam means of said tube to controlled locations within said first area of the target in response to information from said shift register means when said character generator receives information from said register portion.

9. The apparatus according to claim 8 wherein the general position of the beam produced by said beam means is located horizontally within said first area by said reference position counter when information is transferred from said register portion to said character generator.

10. The apparatus according to claim 8 including erase generator means connected to said electrically conductive areas, said erase generator means being controllable for erasing information stored in the first target area after a line of information has been rewritten into said shift register means and the new line of information is to be rewritten in the first target area from said shift register means.

11. The apparatus according to claim 10 including means for entering the information from said shift register means, representing a line of characters, into said computer interface.

12. The apparatus according to claim 8 including control means for selectively changing digital information in said shift register by setting the reference position of the reference position counter to the address of a character to be corrected in said shift register means, so that a correct character from said keyboard can be entered into said register position when said comparator indicates the same count in said memory position counter and said reference position counter.

13. The apparatus according to claim 12 including means responsive to said reference position counter for causing said electron beam means to provide a cursor adjacent the character to be corrected in the said first area of said target.

14. The apparatus according to claim 8 wherein said character generator comprises a dot matrix generator including a pair of digital-to-analog converters for controlling the orthogonal deflection means of said cathode-ray tube;

X and Y counters for controlling said digital-to-analog converters to execute a dot matrix, the intensity of the beam from said beam means in said cathode-ray tube normally being insufficient for storing information on the target of said tube;

and translating means for receiving a digital input and decoding the same to intensify the beam from said beam means when said dot matrix coincides with an element of the character represented by the digital information provided to the translating means.

15. Computer terminal apparatus comprising:

a bistable cathode-ray tube for receiving computer output information, said tube including means for providing an electron beam for writing computer output information in the form of first characters on a first portion of the screen of said tube having the property of retaining said first characters as a group, said tube further including orthogonal beam deflection means;

means for locally storing information representative of a second relatively limited group of characters;

means for coupling said means for locally storing to said orthogonal deflection means for deflecting said electron beam into the configuration of desired characters of the second group on a different portion of the cathode-ray tube screen controlled to have properties different from the first-mentioned portion;

means for changing information with respect to characters stored in said means for locally storing, for editing characters in said means for locally storing;

and means for subsequently causing the writing for storage on said first portion of said cathode-ray tube screen of information as changed in said means for locally storing.

16. The apparatus according to claim 15 wherein said means for changing information with respect to characters stored in said means for locally storing includes means for registering the location of a particular character to be changed and means for altering the particular character selected.

17. The apparatus according to claim 15 wherein said means for locally storing comprises a recirculating memory means into which information representing a plurality of characters may be entered;

said apparatus and said means for changing information including first counter means synchronously operating with said recirculating memory means for registering the position of information in said memory means;

second counter means settable to a count representing the location of information to be changed in said recirculating memory means; and comparator means for comparing the counts in said first and second counter means and for entering replacement information into said recirculating memory means in response to a comparison of counts in said first and second counter means so that replacement information is subsequently transferred to said first portion of said cathode-ray tube from said means for storing.

18. The apparatus according to claim 17 including means responsive to said second counter means for causing said means for providing an electron beam to provide a cursor adjacent a character of information to be replaced.

* * * * *

UNITED STATES PATENT OFFICE

CERTIFICATE OF CORRECTION

Patent No. 3,641,555 Dated February 8, 1972

Inventor(s) JOHN R. GRIFFIN

It is certified that error appears in the above-identified patent and that said Letters Patent are hereby corrected as shown below:

Col. 1, line 15, "rage" should be --rate--.

Col. 8, line 74, "188" should be --118--.

In the claims:

Col. 10, line 31, "identify" should be --identity--.

Col. 10, line 60, after "split-screen" insert --target-- before the period.

Signed and sealed this 12th day of September 1972.

(SEAL)
Attest:

EDWARD M.FLETCHER,JR.
Attesting Officer

ROBERT GOTTSCHALK
Commissioner of Patents